No. 656,774. Patented Aug. 28, 1900.
C. B. MOORE.
INSECT DESTROYER.
(Application filed Dec. 30, 1899.)
(No Model.) 2 Sheets—Sheet 1.
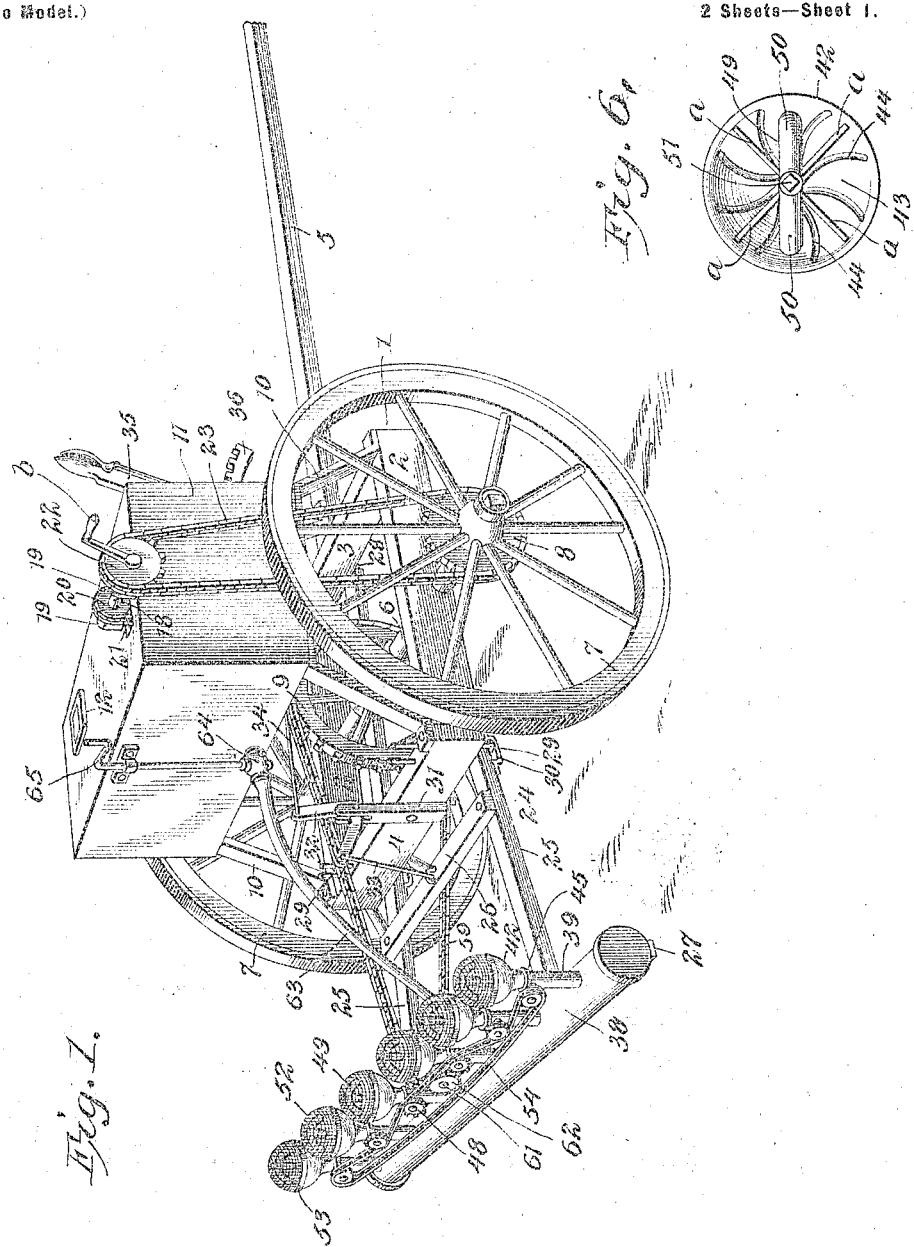
Witnesses
Howard R. Orr
J W Garner
C. B. Moore, Inventor,
By his Attorneys,

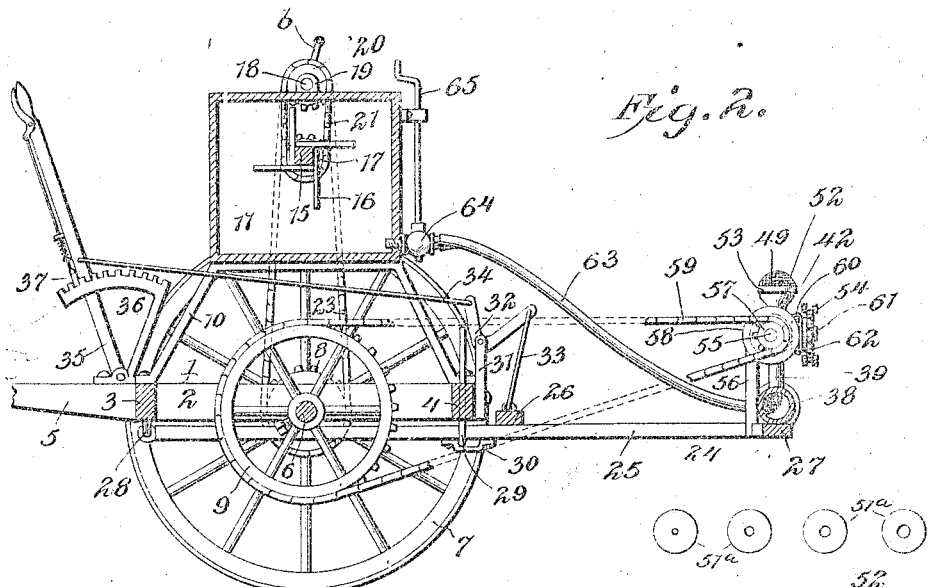
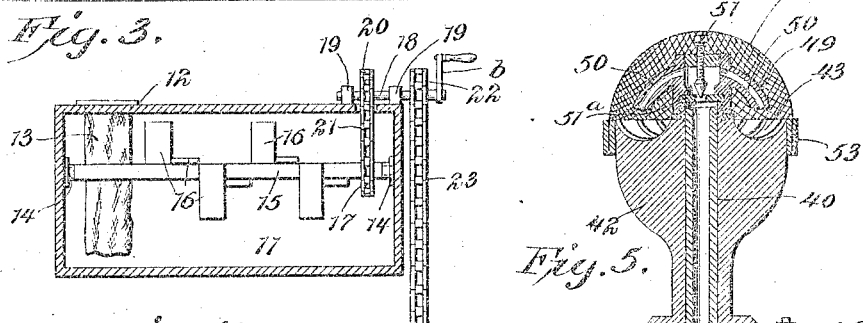
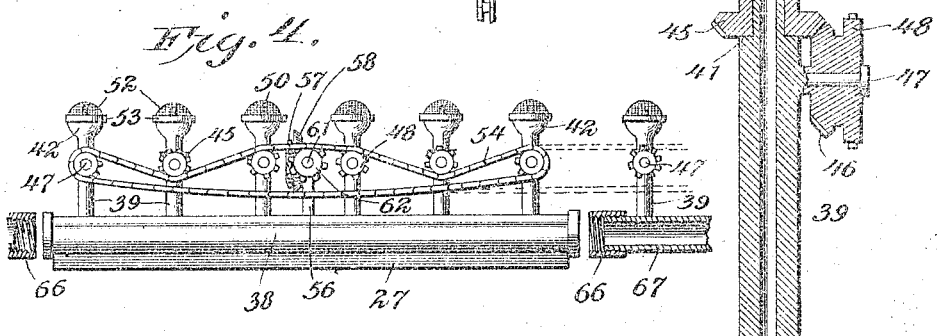

UNITED STATES PATENT OFFICE.

CHARLES B. MOORE, OF ROCHESTER, INDIANA.

INSECT-DESTROYER.

SPECIFICATION forming part of Letters Patent No. 656,774, dated August 28, 1900.

Application filed December 30, 1899. Serial No. 742,109. (No model.)

*To all whom it may concern:*

Be it known that I, CHARLES B. MOORE, a citizen of the United States, residing at Rochester, in the county of Fulton and State of Indiana, have invented a new and useful Insect-Destroyer, of which the following is a specification.

My invention is an improved insect-destroying spraying-machine, its object being to provide a cheap, simple, and efficient machine which is adapted to apply liquid poisons in the form of spray on growing crops to destroy noxious insects, such as the grasshopper, army-worm, potato-beetle, and Hessian fly.

To this end my invention consists in the peculiar construction and combination of devices hereinafter fully set forth, and particularly pointed out in the claims.

In the accompanying drawings, Figure 1 is a perspective view of an insect-destroying spraying-machine embodying my improvements. Fig. 2 is a vertical longitudinal sectional view of the same. Fig. 3 is a detail longitudinal sectional view through the tank, showing the stirring apparatus therein. Fig. 4 is a detail rear elevation of the spraying apparatus. Fig. 5 is a detail sectional view illustrating the construction of my improved spraying devices. Fig. 6 is a top plan view of the same with the foraminous spraying-cap removed.

The truck-frame 1 is rectangular in form, comprising the side bars 2 and the end bars 3 4. The tongue 5 is attached to the front bar 3, or it may be secured to the truck-frame in any other suitable manner. The axle-shaft 6 is mounted in bearings in the side bars 2 and is provided with suitable spindles for the supporting-wheels 7. One of said wheels is fast on the shaft and is provided on its inner side with a sprocket-wheel 8, which rotates therewith. The other wheel 7 is loose on the shaft. Keyed on the center of the shaft 6 is a sprocket-wheel 9.

Supporting-frames 10 are bolted on the truck-frame and serve to carry a tank 11. In the top of the tank is an opening 12, in which is hung a bag 13, designed to contain Paris green, London purple, or other suitable poison in pulverized form. The said bag extends downward nearly to the bottom of the tank. Arranged longitudinally in the tank and journaled in suitable bearings 14 in the end walls thereof is a shaft 15, which is provided with a series of radial stirring-paddles 16, and near one end of said shaft is keyed a sprocket-wheel 17. A counter-shaft 18 is journaled in bearings 19 on the top of the tank and has a sprocket-wheel 20, connected to the wheel 17 by an endless sprocket-chain 21, and on one end of the said shaft 18, which projects beyond the proximate end of the tank, is a sprocket-wheel 22, which is connected to the sprocket-wheel 9 by an endless sprocket-chain 23.

The spraying-frame 24 comprises a pair of rearwardly-extending longitudinal side bars 25, a connecting cross-bar 26, and a cross-bar 27, which connects the rear ends of said side bars. The latter are hinged at their front ends under the front side of the truck, as at 28, this hinged connection between the spraying-frame and the truck-frame admitting of the rear end of said spraying-frame being raised or lowered, and said spraying-frame is secured against lateral movement by vertical U-shaped guide-bars 29, which embrace the side bars of the spraying-frame and operate in vertical openings in the rear bar of the truck-frame. Keepers 30, bolted to the under sides of the cross-bars 25, bear against the lower portions of the guide-rods 29 and admit of the play of the same under said side bars when the spraying-frame is raised or lowered.

On a standard 31, which is bolted centrally to the rear side of the truck-frame, is fulcrumed a bell-crank lever 32, having its rearwardly-extending arm connected to the cross-bar 26 of the spraying-frame by a link 33, and the upwardly-extending arm of said bell-crank lever is connected by a link-rod 34 with a hand-lever 35, of the usual well-known construction, which is mounted on the tongue and is provided with the usual segment-rack 36 and spring-actuated detent 37 to engage with said rack and lock the said hand-lever in any desired position. It will be obvious from the foregoing that the spraying-frame may be raised and lowered by the said hand-lever and supported with its rear end at any desired height.

Supported transversely on the rear side of the spraying-machine is a tube 38, having a series of openings on its upper side in which are screwed the lower ends of a series of spindle-tubes 39, each of which has an extension of reduced diameter 40 at its upper end and a shoulder 41.

On the reduced upper portion of each spindle-tube is swiveled a revoluble sprayer-head 42, the upper side of which has an annulus 43, semicircular in cross-section and in which is formed a series of volute grooves 44. A miter gear-wheel 45 is formed with or attached to the lower end of the hollow shank of each sprayer-head and engages a similar gear 46, mounted on a shaft or spindle 47, which projects horizontally from and is secured to one side of the spindle-tube, the said gear 46 having on its outer side a sprocket-wheel 48, which revolves therewith.

To the upper end of the revoluble sprayer-head 42 is screwed the lower end of the feed-cap T-shaped tube 49, the lateral arms 50 of which are curved downward, as shown in Fig. 5, and adapted to discharge liquid which rises through the spindle-tube into the volute grooved annulus of the revoluble sprayer-head. Each of the said T-tubes is provided with a screw-valve 51, which is adapted to regulate the discharge of liquid from the T-tube or to entirely cut off the same. Secured on each of the said sprayer-heads is a foraminous semispherical cap 52, said caps being removable from said sprayer-heads and having the rims or bands 53 at their lower edges, adapted to fit on said sprayer-heads, as shown.

The sprocket-wheels 48 are connected together and thereby adapted to be actuated in series simultaneously by an endless sprocket-chain 54. The shaft 55 has its bearings in a suitable support 56, which rises from the rear side of the sprayer-frame, and said shaft carries a sprocket-wheel 57 and beveled gear-wheel 58, which are keyed to said shaft. Said sprocket-wheel 57 is connected to the sprocket-wheel 9 by an endless sprocket-chain 59, and said beveled gear-wheel engages a similar wheel 60, which is mounted on a spindle 61, which is carried by the support 56. Secured to and rotating with said beveled gear 60 is a sprocket-wheel 62, which engages the chain 54 and serves to communicate motion to said chain, and hence to rotate the sprayer-heads.

A flexible supply-tube 63 communicates with the fountain-tank 11 through a valve or stop-cock 64 and also with the tube 38, the function of the said flexible tube being to supply the tube 38 with poisoned water or other liquid from the fountain-tank, as will be understood. The operating-rod 65 of the valve or stop-cock 64 extends upward on the rear side of the fountain-tank within easy reach of a driver seated on said fountain-tank.

The operation of my invention is as follows: While the machine is in operation, the rotation of the stirring-paddles in the fountain-tank serves to keep the contents thereof agitated and prevent the poisonous substances from settling and to keep the same in a state of suspension in the water contained in the tank, and thereby preserve the efficiency of the poisonous solution at all times. The poisoned water being fed to the tube 38, on which the vertically-arranged spraying devices rotate, said spraying devices being revolved at a comparatively-high rate of speed by the gear sprocket-wheels and sprocket-chains hereinbefore described, the poisoned water, which is fed to the volute grooved annular faces of the revolving sprayer-heads, will be thrown therefrom centrifugally in the form of a fine spray to a considerable distance, thus causing the poison to be effectually and economically applied to the growing crop over which the machine is driven and to fall upon the noxious insects feeding on said crop.

To enable the machine to apply the poison over a wider area than when equipped as shown in Fig. 1, I provide the ends of the pipe 38 with removable caps 66 and with extensions 67, which are identical in construction with said pipe 38 and are likewise provided with my improved spraying devices, the said extensions being adapted to be coupled to either or both ends of the pipe 38, thereby greatly widening the spraying apparatus. When the said extensions, or either of them are used, the chain 54 must be correspondingly lengthened, as will be understood.

By means of the vertically-adjustable sprayer-frame the spraying apparatus may be brought as close to the growing crop or removed as far therefrom as may be necessary to obtain the best results.

It will be understood that when the machine is being driven from one field to another and is not at work the sprayer-frame will be raised and locked in the position shown in Figs. 1 and 2, and the supply of the poisoned water will be cut off from the spraying apparatus.

In order to increase the efficiency of the revoluble sprayer-heads, I provide the same with a series of radial frets $a$, extending across the annulus faces of the sprayer-heads, as shown in Fig. 6. These frets, conjointly with the volute grooves in said annulus-faces, serve to throw the water centrifugally from the said sprayer-heads and to form a fine spray.

In order to permit the contents of the fountain-tank to be thoroughly stirred by hand before starting the machine in operation in a field, I provide the wheel 22 on the counter-shaft on the fountain-tank with a hand-crank $b$, by which said counter-shaft, and consequently its stirring apparatus, may be operated by the driver, the chain or belt 23 being unshipped from either the wheel 22 or the wheel 8, or a suitable clutch may be provided for said wheel 22, to permit the counter-shaft to be rotated by hand power independently of said wheel 22.

The screw-valve of each sprayer-head is adapted to be seated in the central opening of a feed-disk 51ª, seated in a recess formed in the joint between the spindle-tube and the feed-cap, as shown in Fig. 5, and by employing a series of such disks with openings of different sizes therein and employing a disk having an opening of appropriate size the capacity of the discharge of each of said sprayers can be varied according to the requirements of the case.

Having thus described my invention, I claim—

1. In a spraying apparatus, the combination with a spindle-tube of a sprayer-head revoluble thereon, a feed-cap secured to and removable from said head and having downturned arms to discharge onto the face of the head, a feed-disk, seated in a joint between said feed-cap and said sprayer-head, and a valve seated in an opening in said feed-disk, substantially as described.

2. In a spraying apparatus, the revoluble head in combination with the spindle-tube on which it rotates and the feed-cap having the reversely-disposed arms discharging onto the face of the removable sprayer-head, substantially as described.

3. The combination, in a spraying device, of the centrifugal head, the fixed tube to deliver water thereto and the foraminous cap on said head, substantially as described.

4. The spraying device, comprising the centrifugal sprayer-head, in combination with the fixed T-tube to deliver water to said sprayer-head, and having the valve to regulate the supply of water, substantially as described.

5. The combination, in a spraying device, of the spindle-tube, the sprayer-head revoluble thereon, and having the gear-wheel, and an actuating gear-wheel supported by said spindle-tube and engaging the gear-wheel of the sprayer-head, substantially as described.

6. The combination, in a spraying-machine, of the water-tube, having the spindle-tubes, the spraying-heads mounted on said spindle-tubes, the gears to rotate said sprayer-heads, actuating connections for said gear and the fountain or tank to supply the water-tube, substantially as described.

7. In a spraying-machine, the combination with the truck having the fountain-tank and the power-wheel 9, of the vertically-movable frame hinged to the truck, and having the spraying apparatus provided with the revoluble sprayer-heads, the wheel 57 in bearings carried by said frame, and connections, substantially as described, between said wheel and the sprayer-heads, to rotate the latter, and the endless chain or belt connecting said wheel to the power-wheel 9, substantially as described.

8. In a spraying-machine, the water-tube 38 having the centrifugal spraying devices, substantially as described, and the separable extension-tubes carrying such spraying devices, and adapted to be coupled to said tube 38, for the purpose set forth, substantially as described.

9. In a spraying device, the combination with the spindle-tube, of the revoluble head thereon, the feed-cap, secured thereto and removable therefrom, the feed-disk seated in the joint between said feed-cap and said sprayer-head, and the valve seated in an opening in said feed-disk, substantially as described.

In testimony that I claim the foregoing as my own I have hereto affixed my signature in the presence of two witnesses.

CHARLES B. MOORE.

Witnesses:
RINALDO P. TRUE,
WILLIAM S. GIBBONS.